United States Patent
Matsui

[11] 4,367,934
[45] Jan. 11, 1983

[54] CAMERA WITH AN AUTOMATIC FOCUSING DEVICE

[75] Inventor: Tooru Matsui, Osaka, Japan

[73] Assignee: Minolta Camera Kabushiki Kaisha, Osaka, Japan

[21] Appl. No.: 285,114

[22] PCT Filed: Jan. 7, 1981

[86] PCT No.: PCT/JP81/00002
§ 371 Date: Jul. 22, 1981
§ 102(e) Date: Jul. 22, 1981

[87] PCT Pub. No.: WO81/02067
PCT Pub. Date: Jul. 23, 1981

[30] Foreign Application Priority Data

Jan. 9, 1980 [JP] Japan ............... 55-1265[U]

[51] Int. Cl.³ .................. G03B 3/10; G03B 13/20
[52] U.S. Cl. ........................ 354/25; 354/165; 354/197; 354/198
[58] Field of Search ......... 354/25 R, 25 A, 25 P, 354/25 N, 31 F, 53, 60 E, 60 L, 289, 163, 195, 197, 198, 165; 352/140; 356/1, 4; 250/201, 204

[56] References Cited

U.S. PATENT DOCUMENTS 3,723,003  3/1973  Vockenhuber .............. 356/4
3,836,934  9/1974  Suzuki et al. .............. 354/197
4,251,144  2/1981  Matsuda et al. ............ 354/25

FOREIGN PATENT DOCUMENTS 728860  3/1966  Canada .................... 356/1
54-148525  11/1979  Japan .................... 354/25

*Primary Examiner*—William B. Perkey
*Attorney, Agent, or Firm*—Watson, Cole, Grindle & Watson

[57] ABSTRACT

A distance detecting device for close-up photography applicable to a range finding device of the type wherein light emitted from a light source is projected onto an object through a projecting lens, and the light reflected from the object impinges upon one of a plurality of light receiving elements via a light receiving lens for detecting which one of a plurality of zones the object is located, depending on which one of the light receiving elements receives the light. The device in accordance with the present invention generates a single light pulse for ordinary photography and light pulses successively for close-up photography, indicating whether a camera-to-target-object distance matches a predetermined distance for close-up photography or deviates therefrom. The successive light pulses for close-up photography may be weaker in intensity than the single light pulse for ordinary photography.

4 Claims, 6 Drawing Figures

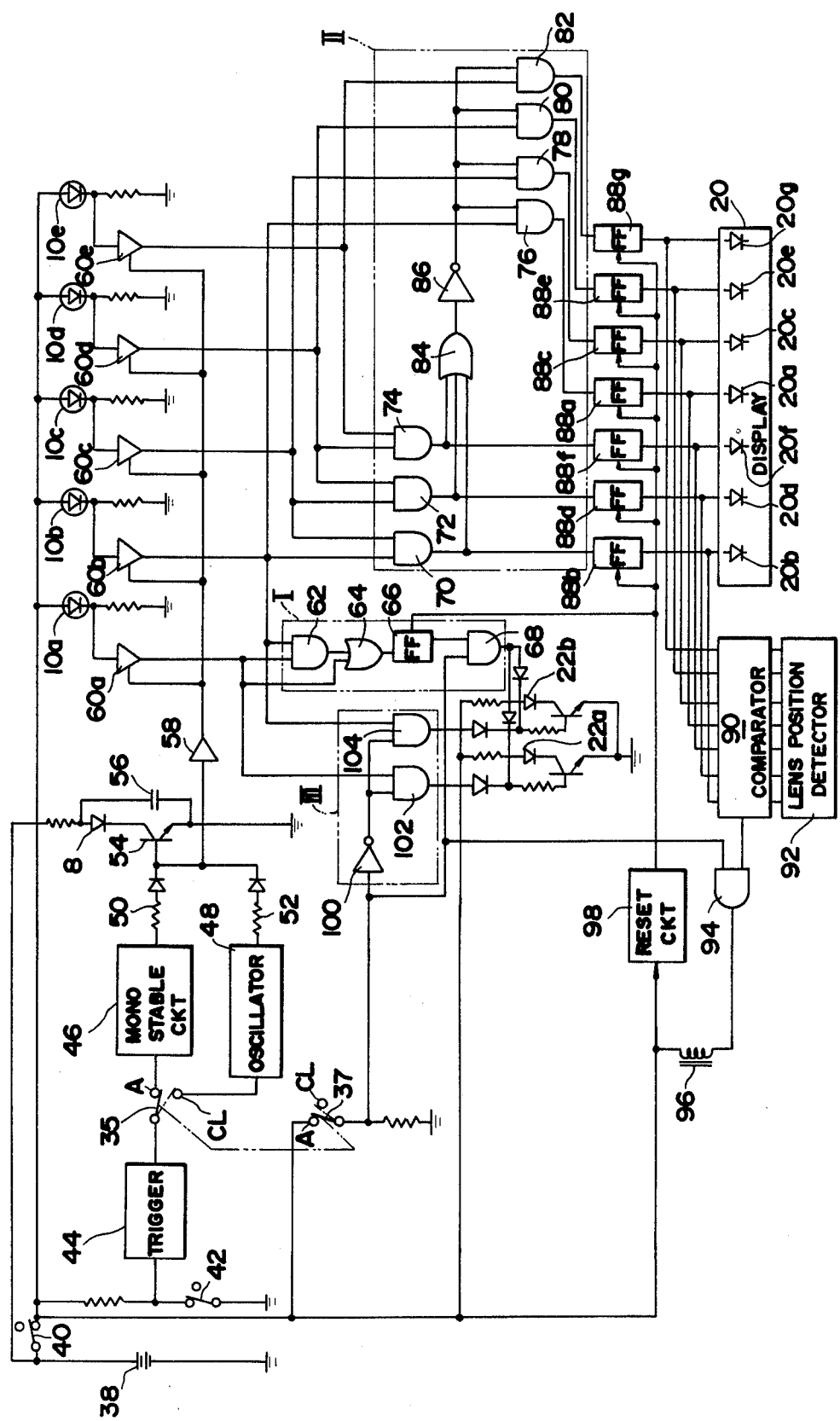

CAMERA WITH AN AUTOMATIC FOCUSING DEVICE

DESCRIPTION

1. Field of the Invention

The present invention relates to a camera including an automatic focusing device which adjusts the focusing of a camera objective or picture taking lens in accordance with a range finding and particular to such apparatus wherein a light from a light source is projected onto a target object, the light reflected therefrom is selectively received by a plurality of light receiving elements, and the object distance is determined in dependence on which light receiving element has received the reflected light.

2. Prior Art

Heretofore, automatic focusing devices have been proposed, such as in U.S. Pat. No. 3,723,003, which devices adjust the focus of a camera objective in accordance with range finding wherein a light emitting element light source is caused to emit a pulse of light, the light pulse reflected from a target object is received by one of a plurality of light receiving elements arranged to respectively receive light from zones at different distances, and the distance to the target object is detected by which element received the light.

SUMMARY OF THE INVENTION

The object of the present invention is to provide a camera including the above type of automatic focusing device which facilitates close-up photography as well.

To attain the object, the camera according to the present invention is arranged such that a light emitting element light source is caused to emit a single light pulse for range finding in ordinary photography, thereby focusing a camera objective or picture taking system. At the same time, the camera is further arranged such that, in the case of close-up photography where the focusing of a picture taking optical system is fixed at a specific distance, the light emitting element is caused to successively emit light pulses for continuous range finding to indicate that the camera and a target object are in the positional relationship most suitable for close-up photography when the fixed distance being focused by the picture taking optical system matches the actual camera-to-target-object distance. According to the present invention, the automatic focusing of the picture taking optical system can be effected in ordinary photography, and at the same time, a continuous range finding operation is performed for close-up photography, the result thereof being indicated to allow easy determination of a relative distance between the camera and a target object with the camera-to-target object distance being changed while the indication of the indicating means is observed thereby enabling easy close-up photography. Additionally, as the light emitting element is caused to emit a light pulse only once for a range finding in ordinary photography, power consumption is saved than in the case when the light emitting element is always caused to succesively emit light pulses.

Furthermore, according to an embodiment of the present invention, a single light emitting element is used for the range findings in both ordinary and close-up photography, resulting in an advantage in terms of space and cost. In addition, in view of the fact that, in close-up photography, it is possible to obtain sufficient accuracy in range finding even if the light from the light emitting element is slightly low in intensity, because a target object is located near the camera, the light for close-up photography is emitted at lower intensity than that for ordinary range finding, thereby saving power consumption, even if the light emitting element emits light successively. In addition, an indication means for the close up focusing is arranged to also indicate that a target object is outside the focusable distance range in ordinary photography by the picture taking optical system, thereby informing a photographer of the need for the changeover from ordinary photography to close-up photography.

BRIEF DESCRIPTION OF THE DRAWINGS

The above objects, features and advantages of the invention are readily apparent from the following description of the invention taken in conjunction with the drawings, wherein:

FIG. 2b is a schematic diagram of a part of FIG. 2a;

FIG. 3 is a circuit diagram showing the electric circuitry of the embodiment.

BEST MODE OF CARRYING OUT THE INVENTION

Figure 1A:
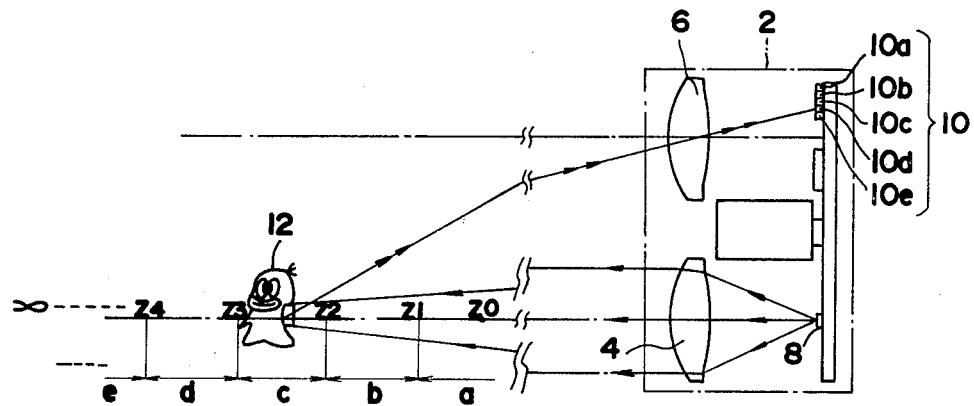
FIG. 1a is a schematic illustration of the optical arrangement of a range finding device.

With reference to FIG. 1a, range finding unit 2 includes light projecting lens 4 and light receiving lens 6 spaced from each other by a predetermined distance. Light emitting element 8 is disposed behind light projecting lens 4. Light receiving elements 10a through 10e arranged behind light receiving lens 6 correspond to different distance zones, respectively. In more detail, with respect to light receiving lens 6 light receiving element 10a is located at a position conjugate with distance zone a, light receiving element 10b at a position conjugate with distance zone b, light receiving element 10c at a position conjugate with distance zone c, light receiving element 10d at a position conjugate with distance zone d, and light receiving element 10e at a position conjugate with distance zone e, respectively. Thus, the light emitted from light emitting element 8 is projected onto target object 12 through light projecting lens 4, and which one of the light receiving elements receiving the light reflected from target object 12 is detected by circuitry to be described more fully hereinafter, whereby a distance zone at which target object 12 is located is detected. It should be noted that the above embodiment is arranged such that one distance zone is identified even when the reflected light is received by two adjacent light receiving elements, as described later. This arrangement allows the division of the range distance of the scene to be photographed into more number of zones than that of the light receiving elements for range finding detection, resulting in increased accuracy of range finding.

Figure 1B:
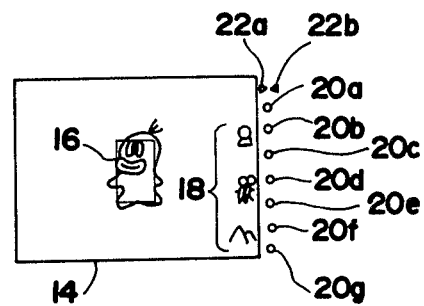
FIG. 1b shows an indication in a viewfinder field.

With reference to FIG. 1b showing the appearance of indication in the viewfinder, range finding mark 16 for a range finding area and distance mark 18 for camera-to-target-object distances are shown within view field 14 of the viewfinder. Furthermore, seven light emitting elements 20a to 20g for distance indications are arranged near distance mark 18 outside view field 14 of the viewfinder. Also arranged above light emitting element 20a are light emitting elements 22a and 22b for in-focus indication in close-up photography and for warning of too short distance in ordinary photography. With the arrangement, one of light emitting elements 20a to 20g is energized in ordinary photography, to indicate a camera-to-target-object distance. When a target object is located closer to the camera than at the shortest focusable distance of a picture taking lens, both light emitting elements 22a and 22b are energized to give a warning of a too short distance. Moreover, when a target object is located at a position suitable for close-up photography, light emitting elements 22a and 22b blink during close-up photography.

Figure 2A:
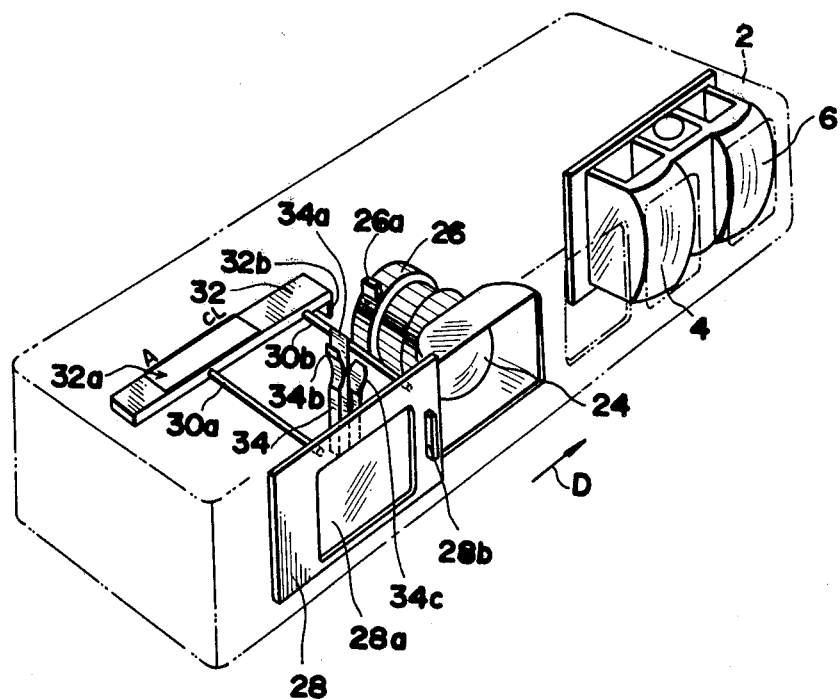
FIG. 2a is a perspective view of the principal part of the camera arrangement of the embodiment.

FIG. 2a is a perspective view of the essential part of a camera showing a mechanism for switching the picture taking optical system from ordinary photography to close-up photography or vice versa. With reference to FIG. 2a, when focus ring 26 is rotated, picture taking lens 24 is displaced wholly or in part, thereby changing the focus distance continuously. Focus ring 26 is provided with projection 26a and gear teeth 26b formed thereon (see FIG. 2b). Projection 26a is adapted for keeping constant the focus distance of picture taking lens 24, i.e. the distance of an object being focused by the lens, for close-up photography and gear teeth 26b is for changing the focus distance of picture taking lens 24 for ordinary photography.

Figure 2B:
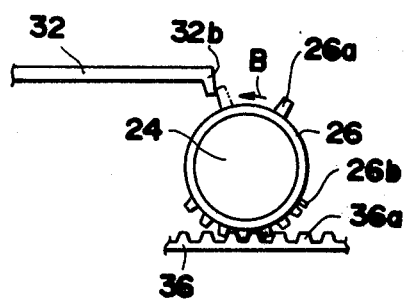

Changeover member 28 for changing over between ordinary and close-up photography conditions is provided with close-up lens 28a and handle 28b, and is slidably guided by a guide mechanism (not shown) to move in the direction of arrow D, whereby the picture taking optical system is switchable between the ordinary photography condition where close-up lens 28a is retracted from the front of picture taking lens 24 and the close-up photography condition where close-up lens 28a is positioned in front of picture taking lens 24. Setting lever 32 is connected to changeover member 28 by connecting rods 30a and 30b, and is slidable integrally with changeover member 28. Index 32a is provided on top of setting lever 32 to point to mark "A" for ordinary photography and mark "CL" for close-up photography as shown in FIG. 2b. Bent portion 32b formed at one end of setting lever 32 is, in close-up photography, located at a predetermined position within the rotational path of projection 26a formed on focus ring 26 such that projection 26a is engaged by bent portion 32b to prevent the rotation of focus ring 26 at a predetermined position, thereby fixing the focus distance of picture taking lens 24 to a given value. Changeover switch 34 changes over the electric circuitry between ordinary and close-up photography conditions. In ordinary photography condition, connecting rod 30b presses contact 34a to connect contact 34b while, in close up photography condition, contact 34 is released from the pressed condition to connect contact 34c.

With the above arrangement, in the ordinary photography condition shown in FIG. 2a, close-up lens 28a is retracted from the front of picture taking lens 24, index 32a of setting lever 32 is registered with mark "A" and bent piece 32b of setting lever 32 is retracted outside the rotatable path of projection 26a of focus ring 26, whereby focus ring 26 can be rotated by a mechanism to be described later. A changeover from the condition shown in FIG. 2a to the close-up photography condition is effected by sliding movement of changeover member 28 to dispose close-up lens 28a in front of picture taking lens 24. Then index 32a on setting lever 32 is registered with mark "CL", with bent piece 32b being placed at a predetermined position within the rotatable path of projection 26a on focus ring 26 so that the rotation of focus ring 26 may be prevented at the predetermined position. Furthermore, contact 34a of changeover switch 34 is connected to contact 34b for ordinary photography and is connected to contact 34c for close-up photography.

FIG. 2b is a schematic diagram of the essential parts for the explanation of a focusing mechanism for picture taking lens 24 for ordinary photography, as well as a focus distance fixing mechanism for picture taking lens 24 for close-up photography. Referring to FIG. 2b, drive member 36 is provided with rack 36a which is in mesh with teeth 26b of focus ring 26. Drive member 36 is charged to and restrained at a predetermined position in conjunction with shutter setting or film wind-up operation. When released upon depression of a range finder button (not shown), drive member 36 is moved to the right under the action of a spring (not shown) or the like, thereby rotating focus ring 26 in the direction of arrow B to change the focusing or focus distance of picture taking lens 24. For close-up photography, focus ring 26 is prevented from rotating under the action of drive member 36 when projection 26a abuts bent portion 32b as shown in FIG. 2b and restrained thereat, while for ordinary photography, a stopping electromagnet described later is energized to stop drive member 36 selectively at several predetermined positions in a manner well known in the art.

The following is a description of the electric circuitry which is switched by using changeover switch 34. With reference to FIG. 3, the circuitry includes power supply 38, power supply switch 40 and range finding switch 42. Upon depression of a range finding button (not shown), power supply switch 40 is closed and then range finding switch 42 is opened. Switches 35 and 37 adapted to be changed over by changeover switch 34 shown in FIG. 2a are both connected to the side "A" in the ordinary photography condition, i.e., when contacts 34a and 34b of changeover switch 34 are in contact with each other, and are both changed over to the side "CL" for the close-up photography condition, i.e., when contacts 34a and 34c of changeover switch 34 are in contact with each other. Connected on either side of switch 35 are trigger circuit 44, monostable circuit 46 and oscillating circuit 48 in the manner as shown in FIG. 2b. When switch 35 is connected to the side "A", transistor 54 is turned on once by an output from monostable circuit 46, and light emitting element 8 is energized by the charge stored in capacitor 56 to emit a light pulse only once. When switch 35 is connected to the side "CL" on the other hand, light emitting element 8 is supplied with successive periodic signals from oscillating circuit 48 to emit light pulses successively. Resistor 52 connected to the output terminal of oscillating circuit 48 has a larger resistance than that of resistor 50 connected to the output terminal of monostable circuit 46. Therefore, in the close-up photography a current flowing to light emitting element 8 is smaller than that during ordinary photography so that the light emitted from light emitting element 8 is lower in intensity. This is to save power consumption during the successive light pulse emission, relying on the fact that a target object is located near a camera in close-up photography, and that it is possible to provide sufficient range finding accuracy even if the light emitted from light emitting element 8 is low in intensity.

Buffer circuit 58 is adapted to synchronize the operational timing of amplifiers 60a through 60e for amplifying the outputs of light receiving elements 10a through 10e, with the timing of light emission from light emitting element 8. With the present embodiment, when a target object is located at a position corresponding to the shortest focusable distance zone of picture taking lens 24, the light pulse reflected from the target object is received by light receiving element 10b alone. When the target object is located at a position where the reflected pulse of light is received by light receiving element 10a disposed at a position corresponding to a distance zone closer than that to be detected by light receiving element 10b, it is judged that focusing is impossible in ordinary photography. Furthermore, when the target object is located in such a position that the light pulse reflected from the target object is received by both light receiving elements 10a and 10b, the picture taking optical system is to be exactly focused on the target object in close-up photography.

AND circuit 62, OR circuit 64, flip-flop 66 and AND circuit 68 together constitute short distance warning circuit I for warning that the target object is positioned closer to a camera than the shortest focusable distance of the picture taking lens in ordinary photography. Short distance warning circuit I is actuated to turn on both light emitting elements 22a and 22b to be viewed in the viewfinder when a light pulse emitted from light emitting element 8 and reflected from the target object is received only by light receiving element 10a or by both light receiving elements 10a and 10b.

AND circuits 70, 72 . . . 82, OR circuit 84 and inverter 86 together constitute distance zone discriminating circuit II for, in ordinary photography, discriminating the distance zone where a target object is located. When the reflected light pulse is received by two adjoining light receiving elements, one of the outputs of AND circuits 70, 72 and 74 becomes a high level, while only one of the outputs of AND circuits 76, 78, 80 and 82 becomes a high level when the reflected light pulse is received by a single light receiving element. Flip-flops 88a through 88g respectively receiving the outputs of AND circuits 70, 72 . . . 82 store the outputs of AND circuits 70, 72 . . . 82. The output of the particular flip-flop to which a high level output is applied becomes a high level, thereby presenting range information, the output being applied to indicating circuit 20, whereby either one of light emitting elements 20a through 20g commensurate with the flip-flop generating a high level output is energized.

The range information provided from flip-flops 88a through 88g is also applied to comparator 90. Comparator 90 also receives an output from lens position signal circuit 92 which presents information of the focusing distance of the picture taking lens by converting the rotational position of the distance ring or the like into an electric signal. Comparator 90 generates a high level output when the above two inputs are matched with each other. The high level output is applied to AND circuit 94, one input terminal of which is connected to power supply 38 through switch 37 which is closed during ordinary photography. AND circuit 94 generates a high level output when the output of comparator 90 becomes a high level in ordinary photography. As described earlier, stopping magnet 96 for stopping the displacement of drive member 36 shown in FIG. 2b, stops the movement of drive member 36 to stop the change of the focus distance of picture taking lens 24 when energized by AND circuit 94. At this time, the range information matches the focus distance information of the picture taking lens, as described earlier, whereby the focus of the picture taking lens is adjusted on a target object. Reset circuit 98 resets flip-flops 66 and 88a through 88g when power supply switch 40 is closed.

Inverter 100 and AND circuits 102 and 104 together constitute focus indicating circuit III for close-up photography. In close-up photography, both switches 35 and 37 are changed over to contact "CL" (i.e., switch 37 is closed), whereby the output of inverter 100 is at a high level. Furthermore, in case a target object is located at a position suitable for close-up photography, when light emitting element 8 is driven to emit light pulses continuously with the frequency of oscillating circuit 48, the light pulses reflected from the target object are received by both light receiving elements 10a and 10b, whereby AND circuits 10 and 104 are both oscillated with the frequency of the reflected light pulses so that both light emitting elements 22a and 22b are turned on and off continuously with that frequency. Additionally, when a target object is positioned slightly displaced from the position suitable for close-up photography, either one of light emitting elements 22a and 22b is continuously turned on and off, thereby indicating that the distance from the camera to the target object to be focused is unsuitable for close-up photography, as well as indicating the direction of the displacement thereof. More specifically, when the distance from the camera to a target object to be focused is longer than the predetermined focus distance for close-up photography of a picture taking optical system, light emitting element 22b alone is continuously turned on and off, and when the distance is shorter, light emitting element 22a alone is continuously turned on and off.

The operation of the present embodiment with the above construction will now be described. For ordinary photography, changeover member 28 and setting lever 32 are in the conditions shown in FIG. 2a, and index 32a on setting lever 32 is registered with mark "A". Close-up lens 28a is retracted from the front of picture taking lens 24. Bent portion 32b of setting lever 32 is also retracted from the rotational path of projection 26a on distance ring 26. Both switches 35 and 37 are connected to contact "A". When a range finding button (not shown) is depressed, power supply switch 40 is closed and reset circuit 98 resets flip-flops 66 and 88a through 88g, followed by a opening of range finding switch 42. As the result, monostable circuit 46 actuates light emitting element 8 to emit a single light pulse. When a target object is located within the focusable distance range of picture taking lens 24, either a single one or adjoining two of light receiving elements 10b through 10e receives a light pulse reflected from the target object, and in response to the output of the light receiving element or elements thereof, either one of flip-flops 88a through 88g generates a high level output, and one of light emitting elements 20a through 20g associated with the corresponding the flip-flop is actuated to thereby indicate a camera-to-target-object distance in the viewfinder. Additionally, when drive member 36 released from its restrained condition upon depression of the range finding button is displaced under the action of a spring or the like (not shown), the focus distance i.e. the distance to be focused by picture taking lens 24 is changed, causing the information of the focus distance to be supplied to comparator 90 through lens position signaling circuit 92. Comparator 90 compares the information of focus distance with the information of the found range from flip-flops 88a through 88g, and energizes stopping magnet 96 through AND circuit 94 when both of the information are matched, thereby stopping the displacement of drive member 36, as well as stopping the change of the focus distance of picture taking lens 24.

When a target object is located closer to a camera than the position within the focusable distance range of picture taking lens 24, the light pulse reflected from the target object is received by light receiving element 10a alone or by both light receiving elements 10a and 10b. In either case, short distance warning circuit I is actuated to turned on both light emitting elements 22a and 22b, whereby a warning is indicated in the viewfinder.

Next, in the case of close-up photography, changeover member 28 is slid to the right from the condition shown in FIG. 2a so that close-up lens 28a may be positioned in front of picture taking lens 24. This causes index 32a of setting lever 32 to be registered with mark "CL" and at the same time bent portion 32a to be in a predetermined position within the rotational path of projection 26a on focus ring 26, whereby switches 35 and 37 are both changed over to the side "CL". Upon depression of a range finding button (not shown), a drive member which has been restrained at its charged position is released, thereby causing distance ring 26 to be rotated. The rotation of focus ring 26 is, however, stopped by projection 26a abuting upon bent portion 32b on setting lever 32, and the focus ring 26 is maintained stopped. Accordingly, in close-up photography, the focus distance of picture taking lens 24 is fixed to a predetermined value, whereby the focus distance of the picture taking optical system consisting of picture taking lens 24 and close-up lens 28a is always maintained constant.

Furthermore, upon depression of the range finding button, light emitting element 8 is driven to emit light pulses successively with the frequency of oscillating circuit 48, allowing the photographer to change the relative distance between the camera and the target object observing the indication in the viewfinder to obtain a relative distance most suitable for close-up photography. Specifically, when a camera-to-target-object distance is too short, light emitting element 22a alone is continuously turned on and off in the viewfinder, and when the distance is too long, light emitting element 22b alone is continuously turned on and off. Therefore, the photographer may change the position of the camera of the target object, or both, observing the indication of the viewfinder until both light emitting elements 22a and 22b are continuously turned on and off. With this latter condition, the picture taking optical system is adjusted to focus on the target object.

Figure 4:
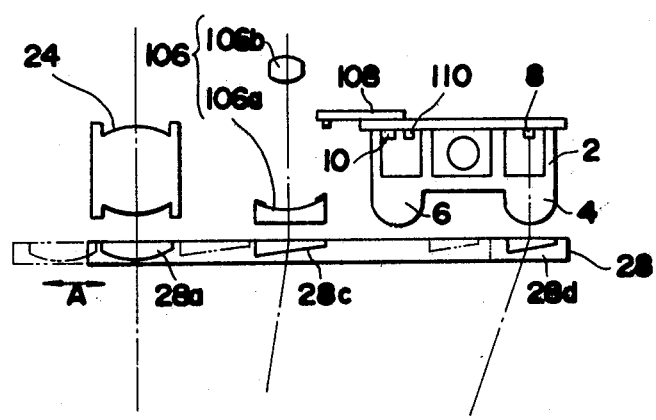
FIG. 4 is a schematic diagram showing a modification of an optical system.

FIG. 4 shows a modification of the optical system of the above embodiment, wherein the same reference numerals are used for the components or members corresponding to those of FIGS. 1 and 2, and a further description thereof is omitted. With reference to FIG. 4, viewfinder optical system 106 consists of objective lens 106a and eyepiece 106b, with a light reflective material applied to the rear circumferential surface of objective lens 106a. Light emitting element holder 108 fixed to range finding unit 2 holds light emitting elements 20a through 20g and 22a and 22b for indication. With the above arrangement, the light emitted from light emitting elements 20a through 20g and 22a and 22b is reflected upon the reflective material on the rear surface of objective lens 106a for introduction into the viewfinder optical path.

Changeover member 28 is provided with viewfinder correction prism 28c and range finding unit correction prism 28d in addition to close-up lens 28a. Moreover, in close-up photography changeover member 28 is positioned as shown by the solid lines in FIG. 4, with close-up lens 28a in front of picture taking lens 24, prism 28c in front of viewfinder optical system 106 and prism 28d in front of light projecting lens 4 of range finding unit 2, respectively. For ordinary photography, changeover member 28 is shifted to the position shown by the dotted lines, whereby close-up lens 28a, prism 28c and prism 28d are retracted from the front of picture taking lens 24, viewfinder optical system 106 and light projecting lens 4, respectively. Light receiving element 110 for close-up photography consists of two elements coupled to be a set which corresponds to close-up light receiving elements 10a and 10b of the above embodiment, and is provided in the present embodiment separately from light receiving element 10 for ordinary photography. When a target object is located at a position suitable for close-up photography, light pulses emitted continuously from light emitting element 8 and reflected from the target object is received by the pair of elements constituting light receiving element 110.

Thus, prisms 28c and 28d are positioned in front of viewfinder optical system 106 and light projecting lens 4 of range finding unit 2, respectively, for close-up photography, and the optical axes of the viewfinder optical system and range finding optical system are inclined towards the optical axis of picture taking lens 24, whereby the parallaxes of the viewfinder and the range finder can be eliminated for close-up photography.

It should be noted that the present invention is not limited to the above embodiments. A picture taking optical system may be arranged, for example, such that a first optical system for ordinary photography is exchangeable for a second optical system for close-up photography and vice versa or that a picture taking lens or part thereof is shifted to a predetermined position and fixed thereat for close-up photography.

I claim:

1. In a camera with an automatic focusing device which detects a distance to a target object by a plurality of light receiving elements receiving a light projected from a light source towards the target object and reflected from the target object, and which can vary the distance being focused by a picture taking optical system, said camera comprising:

change-over means for setting said picture taking optical system selectively to an ordinary photography condition wherein the distance to be focused thereby is variable within a given range, and to a close-up photography condition wherein the distance to be focused is fixed to a value outside of said given range;

first light emission control means for actuating a light emitting element light source to emit a light pulse only once;

second light emission control means for actuating said light emitting element to successively emit light pulses;

a detector means for detecting the output of each of said light receiving elements;

a focusing means capable of changing, in response to the output of said detector means, the distance to be focused by said picture taking optical system; and an indication means for indicating, in response to the output of said detector means, that said target object is at the position corresponding to the given fixed distance to be focused by said picture taking optical system, said automatic focusing device being constructed such that said first light emission control means and said focusing means are operable with said picture taking optical system being set to said ordinary photography condition by said change-over means, and said second light emission control means and said indicator means are operable with said optical system being set to said close-up photography condition.

2. The camera with the automatic focusing device as set forth in claim 1 wherein the same light emitting element serves both as the light emitting element actuated by said first light emission control means and the light emitting element actuated by said second light emission control means.

3. The camera with the automatic focusing device as set forth in claim 1 wherein the intensity of the light emitted from said light emitting element actuated by said second light emission control means is set smaller than that emitted from the light emitting element actuated by said first light emission control means.

4. The camera with the automatic focusing device as set forth in claim 1 wherein said indicator means is constructed to indicate said target object being positioned outside of distance range focusable by said picture taking optical system in the ordinary photography position, as well as to indicate for close-up photography, and such that both indications are changed-over by said change-over means.

* * * * *